Nov. 20, 1956        L. T. SACHTLEBEN        2,771,004
APPARATUS FOR AND METHOD OF TESTING A PROJECTION OPTICAL SYSTEM
Filed April 29, 1953        2 Sheets-Sheet 1
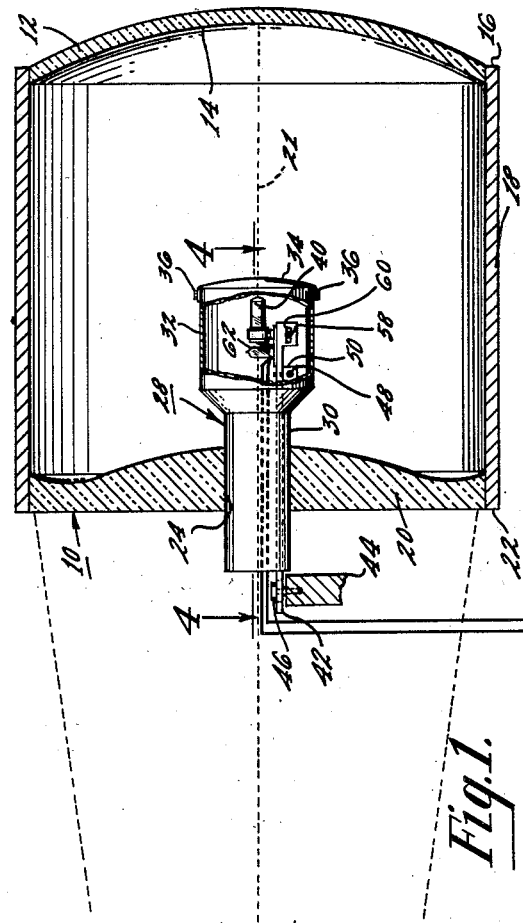
INVENTOR.
*Lawrence T. Sachtleben*
BY *Morris L. Rabin*
ATTORNEY

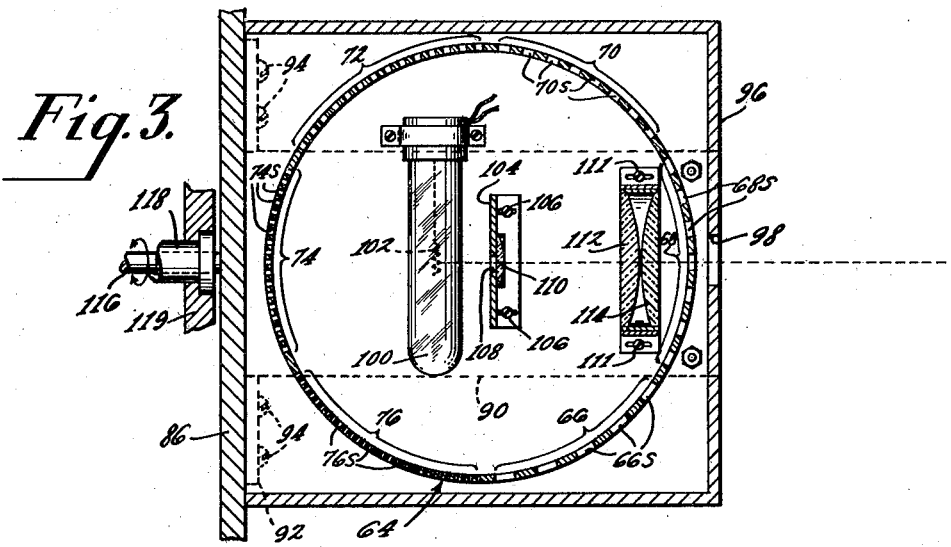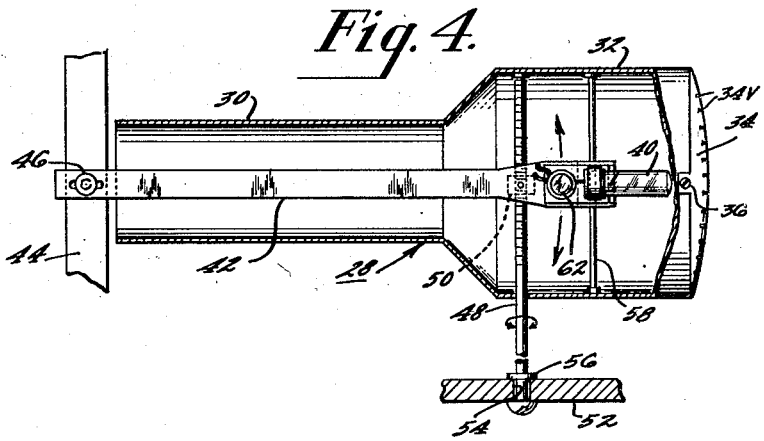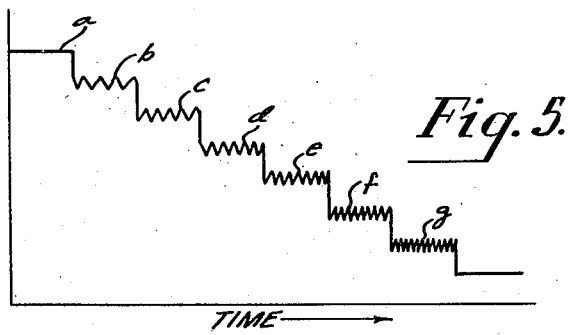

United States Patent Office 2,771,004
Patented Nov. 20, 1956

2,771,004

APPARATUS FOR AND METHOD OF TESTING A PROJECTION OPTICAL SYSTEM

Lawrence T. Sachtleben, Haddonfield, N. J., assignor to Radio Corporation of America, a corporation of Delaware Application April 29, 1953, Serial No. 351,903

13 Claims. (Cl. 88—56)

This invention relates to apparatus for and a method of testing a projection optical system. More specifically, though not exclusively, the invention relates to apparatus for and a method of testing an optical system of the Schmidt or reflective type used in projection television systems, as for example, in theater television systems.

With the advent of theater television has come the necessity of projecting a televised image a relatively long distance. The optical system commonly used to project such a televised image is relatively large and unwieldly. Apparatus and methods of the prior art, adapted for testing relatively smaller optical systems, are not suitable or convenient for use with the present larger optical systems. In some prior art methods, for instance, it is necessary to move the lenses of the optical system into various positions. Such manipulation is not convenient with larger optical systems. Also, some of the prior art methods use auxiliary equipment in the form of a microscope, thereby introducing auxiliary optics whose performance must be assumed to be essentially perfect. Another limitation of the prior art apparatus and methods is that they are applicable to optical systems of relatively short focal lengths, relatively low lens speeds, and relatively small magnifications. In accordance with the present invention, there is provided improved means for and an improved method of testing the quality of a projection optical system of relatively high speed, and at the long conjugate distances at which the system is specifically designed to work at a fixed finite magnification. The testing is substantially under the actual conditions of the performance of the optical system, without the introduction of auxiliary optics in the measuring train.

It is, therefore, a principal object of the present invention to provide improved apparatus for and an improved method of testing a projection optical system.

It is another object of the present invention to provide improved apparatus for and an improved method of determining the aperture response curve of a projection optical system as a function of the fineness of detail that must be imaged by the optical system under test.

Still another object of the present invention is to provide improved apparatus for and an improved method of measuring the behavior of a relatively large optical system throughout the extent of its field, under conditions of normal operation of the optical system.

A further object of this invention is to provide improved apparatus for and an improved method of testing a projection optical system of the Schmidt type without the necessity of moving the optical system and without the use of auxiliary optical equipment which may introduce errors in determining the aperture response of the optical system.

According to the invention, these and other objects and advantages are attained in improved apparatus for and an improved method of testing the quality of an optical system of the Schmidt or reflective type. An opaque face plate, similar in size and shape to the image screen of a cathode ray tube is mounted in the focal surface of the optical system. The opaque face plate is formed with a plurality of narrow transparent slits, and photoelectric means is adjustably mounted behind the face plate in a manner to transduce any light reflected through a selected one of the slits into a signal or voltage. A hollow drum formed with a plurality of groups of slots in its periphery is positioned with respect to the image plane or surface of the optical system so that each slot will pass through the image plane at its nearest distance to the optical system. The slots within each group are of uniform size and parallel to each other, but differ progressively in width from the slots in adjacent groups. A light source extending within the drum projects light through the slots, through the optical system, and through the slits in the opaque face plate. When the drum is rotated, the illuminated slots scan a portion of the image plane, conjugate to a portion of the focal surface containing a selected one of said slits, at a uniform frequency for each group, and at a progressively different frequency for each successive group during each cycle of rotation of the drum. The light passing through a selected one of the slits is transduced into electrical signals by the photoelectric means. These signals are amplified and rectified and fed to the vertical plates of an oscilloscope. The horizontal plates of the oscilloscope are synchronized with the rotation of the drum. The curve that appears upon the face of the oscilloscope is the aperture response curve of the optical system. The slots in the drum may be calibrated in lines per picture height.

As used herein, and in the appended claims, the terms image surface and focal surface refer to those portions of an optical system commonly called the image plane and the focal plane. Since, in a Schmidt type projection optical system, the focal surface is not a plane, but rather a portion of a sphere, the term focal surface is preferred to the term focal plane. The apparatus and method of the present invention, however, may be used to test the quality of any optical system and is not necessarily limited to optical systems of the Schmidt type.

For a more detailed understanding of the present invention, reference is had to the following description, in connection with the accompanying drawings, in which similar elements are designated by similar reference numerals, and in which:

Fig. 1 is a side elevational view, partly in cross-section, and with parts broken away, of a reflective type optical system and the apparatus for testing it, in accordance with the present invention;

Fig. 2 is a front elevational view of an opaque face plate, in accordance with the present invention;

Fig. 3 is an enlarged cross-sectional view of a portion of the testing apparatus shown in Fig. 1, taken along the line 3—3;

Fig. 4 is an enlarged cross-sectional view of a portion of the apparatus in Fig. 1, taken along the line 4—4; and Fig. 5 is an example of an aperture response curve of the type obtained with the apparatus and method of the present invention.

Referring now to Fig. 1, there is shown a Schmidt type or reflective optical projection system 10, whose quality it is desired to test. The projector optical system 10 is substantially similar to that described in the U. S. Patent No. 2,273,801, issued to D. O. Landis, on February 17, 1942, and assigned to the assignee of the present invention. The optical system 10 comprises a spherical mirror or reflector 12, the concave surface 14 of which is adapted to reflect light from the focal surface of the optical system 10 to the image plane 26 and vice versa. The reflector 12 is supported adjacent one end 16 of a hollow cylindrical housing 18. A transparent, aspherical corrector plate or ogee lens 20 is supported within the housing 18, adjacent the other end 22 thereof. The reflector 12 and lens 20 are mutually aligned with respect to each other to define an optical axis 21 of the optical system 10. The lens 20 is shaped in a manner to correct the spherical aberrations which may be introduced by the reflector 12. The lens 20 is formed with a central aperture 24 for the purpose hereinafter appearing. The lens 20 is positioned so that its center is substantially the center of curvature of the reflector 12. The optical system 10 is adapted to project an image at its focal surface situated between the reflector 12 and the lens 20, onto a flat image plane or surface 26.

The optical system 10, adapted to be tested with the apparatus and method of the present invention, may have an optical speed of about $f/0.7$, may have a focal length of 20 inches or more, and a diameter of 25 inches or more. While these dimensions are not to be construed in a limiting sense, they are illustrative of the relatively large type optical system which may be tested by the apparatus and method of the present invention.

A cylindrical, open-ended housing 28, having substantially the same outside dimensions as a cathode ray tube normally used in conjunction with the optical system 10, has a neck portion 30 projecting through the opening 24 in the lens 20. An enlarged portion 32 of the housing 28 extends within the housing 18 of the optical system 10. The housing 28 is axially aligned with the optical system 10 about the optical axis 21 thereof. An opaque face plate 34 is secured to the open end of the enlarged portion 32 of the housing 28, by means of screws 36, or any other suitable means. The plate 34 is of the same shape, size and material as the image face or screen of a cathode ray tube that is normally used with the optical system 10, for projecting a televised image onto the image plane 26. The plate 34 is positioned in the focal surface of the optical system 10. An alternate series of vertical and horizontal transparent slits 38V and 38H respectively, is formed along a diameter of the opaque plate 34, as shown in Fig. 2, for the purpose hereinafter appearing.

Within the housing 28 and directly adjacent the plate 34 is photoelectric pick-up means, such as a photoelectric tube 40, as shown in Fig. 4. Adjustable mounting means are provided for the photoelectric tube 40 in order to position it in a manner to receive light from only a selected one of the series of slits 38V and 38H in the opaque plate 34. To this end, the tube 40 is fixed to one end of a bar 42 by any suitable means. The bar 42 extends through the narrow portion 30 of the housing 28 and is pivotally mounted to a fixed member 33, by means of a screw 46 positioned at substantially the center of curvature of the plate 34. A threaded screw 48 is engaged with a threaded member 50 pivotally attached to the bar 42. The head of the screw 48 extends to one side of a fixed member 52 through a hole 54 therein. A collar 56 is fixed to the screw 48 adjacent the other side of the fixed member 52. It will now be understood that by turning the screw 48 the tube 40 will move in the arc about the pivot screw 46. Thus, means are provided to position the tube 40 opposite a selected one of the slits 38V or 38H in the plate 34.

A guide rail 58 is mounted within the housing 28, parallel to the screw 48, as shown in Fig. 4. The guide rail 58 extends through an enlarged hole 60 in the end portion of the bar 42 in order to aid in positioning the tube 40 opposite a selected slit in the plate 34. Masking means (not shown) may be used in conjunction with the tube 40 for the purpose of directing any light that may penetrate the selected slit in the plate 34 to the tube 40. A cathode-follower tube 62 is mounted on the bar 42 directly behind the tube 40, and electrically connected thereto, for the purpose hereinafter appearing.

Means are provided to scan cyclically the image plane 26 with groups of light images at a uniform frequency for each group and at a progressively different frequency for different groups during each cycle. To this end, there is provided a hollow, cylindrical drum 64. The cylindrical periphery of the drum 64 is formed with a plurality of groups 66, 68, 70, 72, 74 and 76 of oblong-shaped slots 66S, 68S, 70S, 72S, 74S and 76S, respectively as shown in Fig. 3. While only six groups of slots are shown for the purpose of illustration, it is understood that the number of groups of slots used in an actual case may be any number. The usual number, in practice, is between five and ten groups of slots. The slots within each group are of uniform size, parallel to each other, and separated from each other by a distance equal to the width of the slot in each group. The slots in each group differ progressively in width from the slots in adjacent groups. For example, the slots 68S in group 68 are all of equal size, that is, of equal rectangular shape and parallel to each other. The slots 68S, however, in the group 68 are narrower than the slots 66S in the group 66, but wider than the slots 70S in the group 70. In other words, it may be said that the slots 68S differ progressively in width from the slots of the adjacent groups; namely, the slots 66S in the group 66 and the slots 70S in the group 70.

Means are provided to mount and to rotate the drum 64 in a manner such that the slots in each of the groups will pass through the image plane 26 when the slots are at their nearest distance to the optical system 10. The drum 64 is suspended from the shaft 78 of a motor 80 by means of a spider 82. A fly wheel 84 may be mounted on the shaft 78 in order to provide for uniform rotation of the drum 64 about its axis. The motor 80 is secured to an upright member 86 by means of posts 88 in any suitable manner. A shelf 90, perpendicular to the axis of rotation of the drum 64 is mounted beneath the drum 64 by means of a bracket 92 secured to the member 86, as by screws 94. The drum 64 may be surrounded by a housing 96, formed with a window 98 in the front end thereof, for the purpose hereinafter appearing.

Fixed to the shelf 90, by any suitable means, and extending upwardly therefrom into the drum 64, is a lamp 100 positioned so that the center of its filament 102 lies in the diameter of the drum 64 which extends through the center of each slot, and passes through the window 98 in the housing 96, as shown in Fig. 3. A disc 104 adjustably mounted on the shelf 90, as by screws 106, extends upwardly from the shelf 90, into the drum 64, and is formed with a central aperture 108 for the purpose of allowing a beam of light from the filament 102 of the lamp 100 to pass therethrough. A lens 110, for focusing purposes may be mounted on the disc 104, by any suitable means. Also extending upwardly from the shelf 90 into the drum 64, and adjustably secured to the shelf 90, as by screws 111, are a pair of focussing and condensing lenses 112 and 114, respectively, axially aligned with the aperture 108 in the disc 104, the window 98 in the housing 96 and the slots in the drum 64. It will now be understood that the drum 64 may be mounted for rotation in a horizontal plane which passes through the center of the slots in the drum 64, and which contains the axis 21 of the optical system 10.

The lens 110, 112 and 114 serve to focus an image of the filament 102 of the lamp 100 a short distance beyond the periphery of the drum. The lenses 112 and 114 serve to direct the light beam onto the lens 20, whence the light beam is directed onto the reflector 12, and reflected onto the plate 34, which is in the focal surface of the optical system 10.

In order to provide for the rotation of the drum in any plane which contains the central diameter of the drum passing through the window 98 in the housing 96, there is provided a shaft 116 fixed to the member 86 and extending therefrom in a direction of said central diameter of the drum 64. The shaft 116 is journalled in a bearing 118 for rotation therein. The bearing 118 is fixed to a fixed member 119. It will now be understood that the drum 64 may be made to rotate in any plane in which the axis 21 of the optical system 10 lies. In practice, however, the drum 64 is made to rotate in either a horizontal plane which includes the optical axis 21 or in a vertical plane which also includes the optical axis 21. It will also be understood that the light from the lamp 100 uniformly illuminates the slots as they pass through the image plane 26 and these illuminated slots are imaged by the optical system 10 upon the plate 34 where the light passes through a selected one of the slits therein to the tube 40. The tube 40 transduces the intensity of light received thereby into signals which are coupled through the cathode-follower 62 to an amplifier and rectifier unit 120, of conventional type. The amplifier and rectifier unit 120 is coupled to the vertical deflection plates of an oscilloscope 122. The horizontal deflection plates of the oscilloscope 122 is synchronized with the cyclical rotation of the drum 64.

The method of testing the quality of the optical system 10 by the apparatus and method of the present invention will now be described. The central diameter of the drum, lying in the plane that bisects the slots in the drum is aligned with the axis 21 of the optical system 10, and the drum 64 is rotated at a constant speed. The drum slots within each group will then scan the image plane 26 at a constant frequency but at a frequency differing progressively from the scanning frequency of the slots in the adjacent groups, during each revolution of the drum 64. The light from the slots, appearing in a conjugate portion of the image plane 26, will be reflected through the optical system 10 onto a corresponding conjugate portion of the opaque plate 34, in the focal surface. Since the slots in the drum 64 are bisected by a plane which contains the axis 21 of the optical system 10, the light image appearing on the opaque plate 34 may be made to pass through a selected slot 38V which is in the conjugate focal surface. The tube 40 is positioned to receive light passing through the selected transparent slit 38V, and transduces the light received thereby into signals or voltages. These signals or voltages are coupled through the cathode-follower 62 to the amplifier, where they may also be rectified, and then displayed upon the screen 124 of the oscilloscope 122. In Fig. 1, there is shown on the screen 124 of the oscilloscope 122 an unrectified (assuming the rectifier section of the amplifier has been cut out) aperture response curve 126 of the optical system 10 produced by six groups of slots, uniform in each group but varying progressively in width from group to group. In Fig. 5, there is shown an amplified and rectified aperture response curve of an optical system under test wherein the portion $a$ represents 100 percent unmodulated light; the portion $b$ represents 100 percent modulated light, as by the slots 66S in the group 66; the portion $c$ represents 100 percent modulated light at a higher frequency, as by the slots 68S in the group 68, etc. The slope of the aperture response curve, such as the aperture response curve of Fig. 5, with respect to the horizontal represents a function of the quality of the lens system under test. For example, in comparing similar lens systems, the smaller the angle between a frequency response curve and the horizontal, the beter the lens system.

The heights of the steps $b$, $c$, $d$, $e$, $f$ and $g$ in the amplified and rectified aperture response curve of Fig. 5 may represent the aperture response in terms of resolution lines of a televised image. For example, if the projection system is designed to produce a 15 ft. high picture, the slots will range in width approximately between $$\frac{15 \times 12}{200} = 0.9 \text{ inch}$$

and $$\frac{15 \times 12}{3200} = 0.056 \text{ inch}$$

for a range from 100 to 1600 lines per picture height.

By scanning the image plane 26 at different conjugate portions, in a horizontal plane passing through the optical axis 21 the aperture response curve of the optical system 10 may be determined at corresponding conjugate portions in the focal surface, corresponding with selected ones of the vertical slits 38V. In a similar manner, by rotating the entire drum assembly 90° about the shaft 116, the aperture response curves may be derived for the optical system through selected conjugate portions on the plate 34 which correspond to the horizontal slits 38H.

Thus, there has been shown and described, in accordance with the objects of the present invention, improved apparatus for and an improved method of determining the quality of a projection optical system. By the apparatus and method, of the present invention, an aperture response curve for conjugate portions on the image surface and focal surface is presented on the screen of an oscilloscope where it may be read, or pohotgraphed for permanent record purposes. The slots in the different groups in the rotating drum may be calibrated in lines per picture height in order to determine the quality of the projected optical system, used to project televised images.

What is claimed is:

1. Apparatus for testing the quality of an axially aligned optical system adapted to project an image at its focal surface onto an image surface, said apparatus comprising an opaque plate, means to mount said plate in said focal surface, said plate being formed with a plurality of transparent slits, photoelectric means adjustably mounted on said mounting means in a position to receive light from said image surface, through said optical system, and through a selected one of said slits, a hollow drum formed with a plurality of parallel slots in its periphery, means to mount and to rotate said drum so that each slot passes through selected portions of said image surface when each of said slots is at its nearest distance to said optical system, a light source extending within said drum, means to project light from said source through said slots, through said optical system, and through said selected one of said slits, signal indicating means, and means to couple said photoelectric means to said indicating means, whereby to display the signal response of said photoelectric means to the light projected through said selected one of said slits.

2. Apparatus for testing the quality of an axially aligned optical system adapted to project an image at its focal surface onto an image surface, said apparatus comprising an opaque plate, means to mount said plate in said focal surface, said plate being formed with a plurality of transparent slits, photoelectric means adjustably mounted on said mounting means in a position to receive light from said image surface, through said optical system, and through a selected one of said slits, a hollow drum formed with a plurality of parallel slots in its periphery, means to mount and to rotate said drum so that each slot passes through selected portions of said image surface when each of said slots is at its nearest distance to said optical system, a light source extending within said drum, means to project light from said source through said slots, through said optical system, and through said selected one of said slits, signal indicating means, and means to couple said photoelectric means to said indicating means, whereby to display the signal response of said protoelectric means to the light projected through said selected one of said slits, each of said slits being substantially perpendicular to an adjacent one of said slits.

3. Apparatus for testing the quality of an axially aligned optical system adapted to project an image at its focal surface onto an image surface, said apparatus comprising an opaque plate, means to mount said plate in said focal surface, said plate being formed with a plurality of transparent slits, photoelectric means adjustably mounted on said mounting means in a position to receive light from said image surface, through said optical system, and through a selected one of said slits, a hollow drum formed with a plurality of parallel slots in its periphery, means to mount and to rotate said drum so that each slot passes through selected portions of said image surface when each of said slots is at its nearest distance to said optical system, a light source extending within said drum, means to project light from said source through said slots, through said optical system, and through said selected one of said slits, signal indicating means, and means to couple said photoelectric means to said indicating means, whereby to display the signal response of said photoelectric means to the light projected through said selected one of said slits, said slots being formed in groups, the slots within each group being of the same width with respect to each other, but of a progressively different width with respect to the slots of adjacent groups.

4. Apparatus for testing the quality of an axially aligned optical system adapted to project an image at its focal surface onto an image surface, said apparatus comprising an opaque plate, means to mount said plate in said focal surface, said plate being formed with a plurality of transparent slits, photoelectric means adjustably mounted on said mounting means in a position to receive light from said image surface, through said optical system, and through a selected one of said slits, a hollow drum formed with a plurality of parallel slots in its periphery, means to mount and to rotate said drum so that each slot passes through selected portions of said image surface, when each of said slots is at its nearest distance to said optical system, a light source extending within said drum, means to project light from said source through said slots, through said optical system, and through selected one of said slits, signal indicating means, and means to couple said protoelectric means to said indicating means, whereby to display the signal response of said photoelectric means to the light projected through said selected one of said slits, said signal indicating means being an oscilloscope having a sweep circuit synchronized to the rotation of said drum, and said coupling means comprising a cathode-follower, signal amplifying and rectifying means.

5. Apparatus for testing the quality of an axially aligned optical system of the type comprising a substantially spherical reflector having a concave surface adapted to reflect light from the focal surface of said system onto an image surface, and an aspherical correcting lens positioned near the center of curvature of said reflector and adapted to correct spherical aberrations introduced by said reflector, said apparatus comprising an opaque face plate, means to mount said plate in axial alignment with said system, between said reflector and said lens, and in said focal surface, said plate being formed with a plurality of transparent slits, photoelectric means adjustably mounted on said mounting means, between said plate and said image surface, and responsive to light reflected from said reflector through a selected one of said slits, whereby to produce a signal proportional to the intensity of light received thereby, a hollow drum formed with a plurality of groups of slots in its periphery, the slots within each group being of uniform size and parallel to each other, the slots in each group differing progressively in width from the slots in adjacent groups, means to mount and to rotate said drum about its axis so that each slot passes through said image surface at its nearest distance to said lens, a light source and light projecting means therefor, extending within said drum to project light through said slots and said lens and onto said reflector, signal indicating means, and means to couple said photoelectric means to said signal indicating means to display the signals derived from the light passing through said slots and said selected one of said slits, said plurality of transparent slits comprising an alternate series of horizontal and vertical slits disposed along a line dividing said plate into equal parts.

6. Apparatus for testing the quality of an axially aligned optical system of the type comprising a substantially spherical reflector having a concave surface adapted to reflect light from the focal surface of said system onto an image surface, and an aspherical correcting lens positioned near the center of curvature of said reflector and adapted to correct spherical aberrations introduced by said reflector, said apparatus comprising an opaque face plate, means to mount said plate in axial alignment with said system, between said reflector and said lens, and in said focal surface, said plate being formed with a plurality of transparent slits, photoelectric means adjustably mounted on said mounting means, between said plate and said image surface, and responsive to light reflected from said reflector through a selected one of said slits, whereby to produce a signal proportional to the intensity of light received thereby, a hollow drum formed with a plurality of groups of slots in its periphery, the slots within each group being of uniform size and parallel to each other, the slots in each group differing progressively in width from the slots in adjacent groups, means to mount and to rotate said drum about its axis so that each slot passes through said image surface at its nearest distance to said lens, a light source and light projecting means therefor, extending within said drum to project light through said slots and said lens and onto said reflector, signal indicating means, and means to couple said photoelectric means to said signal indicating means to display the signals derived from the light passing through said slots and said selected one of said slits.

7. Apparatus for testing the quality of an axially aligned optical system of the type comprising a substantially spherical reflector having a concave surface adapted to reflect light from the focal surface of said system onto an image surface, and an aspherical correcting lens positioned near the center of curvature of said reflector and adapted to correct spherical aberrations introduced by said reflector, said apparatus comprising an opaque face plate, means to mount said plate in axial alignment with said system, between said reflector and said lens, and in said focal surface, said plate being formed with a plurality of transparent slits, photoelectric means adjustably mounted on said mounting means, between said plate and said image surface, and responsive to light reflected from said reflector through a selected one of said slits, whereby to produce a signal proportional to the intensity of light received thereby, a hollow drum formed with a plurality of groups of slots in its periphery, the slots within each group being of uniform size and parallel to each other, the slots in each group differing progressively in width from the slots in adjacent groups, means to mount and to rotate said drum about its axis so that each slot passes through said image surface at its nearest distance to said lens, a light source and light projecting means therefor, extending within said drum to project light through said slots and said lens and onto said reflector, a signal indicating means, and means to couple said photoelectric means to said signal indicating means to display the signals derived from the light passing through said slots and said selected one of said slits, said signal indicating means being an oscilloscope having a sweep circuit synchronized to the rotation of said drum, and said coupling means comprising a cathode-follower, amplifying and rectifying means.

8. Apparatus for testing the quality of an axially aligned optical system of the type comprising a substantially spherical reflector having a concave surface adapted to reflect light from the focal surface of said system onto an image surface, and an aspherical correcting lens positioned near the center of curvature of said reflector and adapted to correct spherical aberrations introduced by said reflector, said apparatus comprising an opaque face plate, means to mount said plate in axial alignment with said system, between said reflector and said lens, and in said focal surface, said plate being formed with a plurality of transparent slits, photoelectric means adjustably mounted on said mounting means, between said plate and said image surface, and responsive to light reflected from said reflector through a selected one of said slits, whereby to produce a signal proportional to the intensity of light received thereby, a hollow drum formed with a plurality of groups of slots in its periphery, the slots within each group being of uniform size and parallel to each other, the slots in each group differing progressively in width from the slots in adjacent groups, means to mount and to rotate said drum about its axis so that each slot passes through said image surface at its nearest distance to said lens, a light source and light projecting means therefor, extending within said drum to project light through said slots and said lens and onto said reflector, signal indicating means, means to couple said photoelectric means to said signal indicating means to display the signals derived from the light passing through said slots and said selected one of said slits, and means to rotate said drum about a central diameter of said drum.

9. A method of testing an optical system, having a focal surface and an image surface, for aperture response comprising the steps of cyclically scanning a conjugate portion of said image surface with a plurality of light images during each cycle, transducing the light from said light images derived at a corresponding conjugate portion of said focal surface into electrical signals, detecting said signals, amplifying said detected signals, and transducing the resulting signals into visual signals.

10. A method of testing an optical system as defined in claim 9, wherein said step of detecting said signals comprises the step of rectifying said signals.

11. A method of testing an optical system, having a focal surface and an image surface, for aperture response comprising cyclically scanning a conjugate portion of said image surface with a plurality of groups of light images at a uniform frequency for each group but at a progressively different frequency for successive groups during each cycle, transducing the light from said light images derived at a corresponding conjugate portion on said focal surface into electrical signals, detecting said signals, amplifying said detected signals, and transducing the resulting signals into visual signals.

12. A method of displaying on an oscilloscope the aperture response curve as a function of the resolution of a projection optical system of the type comprising a substantially spherical reflector having a concave surface adapted to reflect light from the focal surface of said system onto an image surface, and an aspherical correcting lens positioned near the center of curvature of said reflector, said method comprising the steps of cyclically scanning a conjugate portion of said image surface, with groups of light images, at a uniform frequency for each group and at a progressively different frequency for adjacent groups during each cycle, transducing the light from said light images derived at a corresponding conjugate portion on said focal plane into electrical signals, synchronizing said oscilloscope with the scanning cycle of said groups of light images, and applying said signals, derived during each cycle, to said oscilloscope.

13. A method of displaying on an oscilloscope the aperture response curve of a projection optical system of the type comprising a substantially spherical reflector having a concave surface adapted to reflect light from the focal surface of said system onto an image surface, and an aspherical correcting lens positioned near the center of curvature of said reflector, said method comprising the steps of cyclically scanning a conjugate portion of said image surface, with groups of light images, at a uniform frequency for each group and at a progressively different frequency for adjacent groups during each cycle, transducing the light from said light images derived at a corresponding conjugate portion on said focal plane into electrical signals, amplifying and rectifying said signals, synchronizing said oscilloscope with the scanning cycle of said groups of light images, and applying said amplified and rectified signals, derived during each cycle, to said oscilloscope.

No references cited.